United States Patent
Bhatia

(10) Patent No.: US 12,497,542 B2
(45) Date of Patent: Dec. 16, 2025

(54) COMPOSITION AND FLOORING PRODUCT COMPRISING SUCH COMPOSITION

(71) Applicant: Aladdin Manufacturing Corporation, Calhoun, GA (US)

(72) Inventor: Rajeev Bhatia, Hixson, TN (US)

(73) Assignee: Aladdin Manufacturing Corporation, Calhoun, GA (US)

( * ) Notice: Subject to any disclaimer, the term of this patent is extended or adjusted under 35 U.S.C. 154(b) by 745 days.

(21) Appl. No.: 17/296,065

(22) PCT Filed: Oct. 22, 2019

(86) PCT No.: PCT/US2019/057352
§ 371 (c)(1),
(2) Date: May 21, 2021

(87) PCT Pub. No.: WO2020/112276
PCT Pub. Date: Jun. 4, 2020

(65) Prior Publication Data
US 2022/0010174 A1    Jan. 13, 2022

Related U.S. Application Data

(60) Provisional application No. 62/771,277, filed on Nov. 26, 2018.

(30) Foreign Application Priority Data

Dec. 13, 2018 (EP) .................................... 18212374

(51) Int. Cl.
  C09J 5/06    (2006.01)
  A47G 27/02  (2006.01)
(Continued)

(52) U.S. Cl.
  CPC ................ *C09J 5/06* (2013.01); *A47G 27/02* (2013.01); *C09J 127/06* (2013.01); *C09J 175/06* (2013.01);
(Continued)

(58) Field of Classification Search
  CPC . C09J 5/06; C09J 127/06; C09J 175/06; C09J 2427/00; C09J 2475/00; C09J 175/04; A47G 27/02; E04F 15/105; C08L 75/04
  See application file for complete search history.

(56) References Cited

U.S. PATENT DOCUMENTS

| | | |
|---|---|---|
| 3,882,191 A | 5/1975 | Balatoni et al. |
| 4,382,986 A | 5/1983 | Reuben |

(Continued)

FOREIGN PATENT DOCUMENTS

| | | |
|---|---|---|
| CN | 201265239 Y | 7/2009 |
| CN | 201671299 U | 12/2010 |

(Continued)

OTHER PUBLICATIONS

JP20150184488 (Year: 2015).*

(Continued)

*Primary Examiner* — Samir Shah
(74) *Attorney, Agent, or Firm* — Meunier Carlin & Curfman LLC

(57) ABSTRACT

A hot-melt composition is provided. The hot-melt composition includes thermoplastic polyurethane (TPU) and polyvinylchloride (PVC), the weight ratio of TPU over PVC is in the range of 50/50 to 95/5, and the TPU and PVC together forms at least 50% w of the composition.

15 Claims, 1 Drawing Sheet

(51) Int. Cl.
  *C09J 127/06* (2006.01)
  *C09J 175/06* (2006.01)
  *E04F 15/10* (2006.01)
(52) U.S. Cl.
  CPC ......... *E04F 15/105* (2013.01); *C09J 2427/00* (2013.01); *C09J 2475/00* (2013.01); *E04F 2201/043* (2013.01)

(56) References Cited

U.S. PATENT DOCUMENTS

| | | | |
|---|---|---|---|
| 5,457,146 A * | 10/1995 | Ogoe | C08L 75/04 525/440.12 |
| 5,567,497 A | 10/1996 | Zegler et al. | |
| 6,844,073 B1 | 1/2005 | Helmeke et al. | |
| 7,322,159 B2 | 1/2008 | Stone et al. | |
| 9,598,871 B2 | 3/2017 | Qiong | |
| 2003/0015282 A1 * | 1/2003 | Reisdorf | D04H 1/48 156/244.11 |
| 2011/0275733 A1 * | 11/2011 | Prissok | C08G 18/4854 523/105 |
| 2016/0032597 A1 | 2/2016 | Keane | |
| 2016/0215174 A1 | 7/2016 | He et al. | |

FOREIGN PATENT DOCUMENTS

| | | |
|---|---|---|
| CN | 102786898 A | 11/2012 |
| CN | 103131103 A | 6/2013 |
| CN | 105670179 A | 6/2016 |
| CN | 105799134 A | 7/2016 |
| CN | 105860909 A | 8/2016 |
| CN | 106589563 A | 4/2017 |
| CN | 108641661 A | 10/2018 |
| EP | 0326704 A2 | 8/1989 |
| JP | 2004156165 A | 6/2004 |
| JP | 2015184488 A * | 10/2015 |
| WO | WO-2010/058876 A1 | 5/2010 |
| WO | WO-2016/144756 A1 | 9/2016 |

OTHER PUBLICATIONS

Extended European Search Report for European Patent Application No. 18212374.5, dated Jul. 31, 2019, (8 pages), European Patent Office, Munich, Germany.
International Searching Authority, International Search Report and Written Opinion for International Application No. PCT/US2019/057352, dated Jan. 14, 2020, (8 pages), U.S. Patent and Trademark Office, USA.

* cited by examiner

COMPOSITION AND FLOORING PRODUCT COMPRISING SUCH COMPOSITION

CROSS-REFERENCE TO RELATED APPLICATIONS

The present application is a national phase entry of PCT/US2019/057352, filed on Oct. 22, 2019, which claims the benefit of priority of European Application No. 18212374.5, filed Dec. 13, 2018, and U.S. Provisional Application No. 62/771,277, filed Nov. 26, 2018, the entire contents of which are hereby incorporated by reference in their entirety for all purposes.

TECHNICAL FIELD

The present invention relates to a composition, being a hot-melt composition, and flooring products which are provided with a backing comprising such hot-melt composition.

BACKGROUND

The inventors have been looking for easy and simple ways to provide nonskid properties to the outer backing of flooring products, such as vinyl type floor coverings, such as luxury vinyl tiles (LVT), carpets and rugs. As an example, for LVT, two possible ways to provide some anti-skid properties to the LVT products are used in the art. The first route is the provision of a PVC film to the back of the LVT, which PVC has improved nonskid properties. The used PVC has to be soft in order to provide grip, but this PVC typically is not sprayable. The second route is the use of PVC plastisol, applied to the backing of the LVT, which needs further heating and curing, and therefore is quite expensive, to provide nonskid properties. Again, the plastisol has to provide a softness that will help grip the floor and provide non-skid properties.

BRIEF SUMMARY

Surprisingly, a polymer mixture or composition was found to be easily applicable while giving improved nonskid properties to the backing of flooring products, such as vinyl type floor coverings, carpets and rugs.

According to a first aspect of the invention, a hot-melt composition is provided, which comprises thermoplastic polyurethane (TPU) and polyvinylchloride (PVC), the weight ratio of TPU over PVC being in the range of 50/50 to 95/5, the TPU and PVC together forming at least 50% w of the composition.

More preferred, the TPU and PVC together forming at least 75% w of the composition, such as at least 80% w or even at least 90% w of the total weight of the composition. In some embodiments, the TPU and PVC substantially provide completely the composition. A composition may be provided, wherein the TPU and the PVC together provide the composition.

More preferred, the weight ratio of TPU over PVC is in the range of 75/25 to 85/15, such as in the range of 70/30 to 80/20.

According to some embodiments, the TPU may be selected from the group consisting of polyester-based, polycaprolactam-based and polyether-based TPU. More preferred, the TPU is chosen from polyester-based TPU.

According to some embodiments, the Shore A hardness of the TPU is in the range of about 50 to about 70, e.g. I the range of 50 to 70.

According to some embodiments, the softening point of the TPU may be above 70° C. According to some embodiments, the softening point of the hot-melt composition may be in the range of 5 to 165° C. According to some embodiments, the melting point of the hot-melt composition may be in the range 60 to 200° C.

Preferably the hot-melt composition may have a relatively low shear modulus, such as a shear modulus in the range of 500 to 1500 psi, preferably in the range of 600 to 1200 psi. Since the low moduli hot-melt composition gets deformed easily in shear mode, this helps the composition to grab the substrate and provide anti-skid property. According to some embodiments, the melt flow is in a range of 10 to 200 g/10 mins According to some embodiments, the PVC may have an average molecular weight in the range of 30,000 to 250,000. More preferred, the average molecular weight of the PVC is in the range of 45,000 to 200,000.

According to some embodiments, the composition may have melting temperature in the range of 75 to 125° C. More preferred, the melting temperature is in the range of 80-120° C.

The composition may be a foamed composition or a non-foamed composition.

The composition according to the first aspect of the invention has the advantage that it can be applied using known hot melt adhesive application tools. It is dispensed in a fairly easy way using standard hot melt adhesive tools such as hot melt dispensers. As such it can be used to provide flooring products, such as synthetic based, e.g. polyurethane based floor coverings, polyolefin based floor coverings like polyethylene or polypropylene based floor coverings, vinyl based floor coverings, all being tiles, slabs or panels, e.g. LVT (luxury vinyl tiles), carpets and rugs (such as bath rugs), with a non-skid lower backing without much problems in applying the product at the backing.

The composition further has the advantage that is does not cause stacked tiles to stick to each other (called blocking), especially when they are packed in boxes and/or during shipment, especially in hot climates.

According to a second aspect of the invention, a flooring product is provided, which flooring product comprises an outer backing provided from a hot-melt composition according to the first aspect of the invention.

According to some embodiments, the flooring product may be selected from the group consisting of vinyl-based flooring products, carpets and rugs.

According to some embodiments, the outer backing may have a thickness in the range of 0.5 to 4.0 mm. More preferred, the thickness is in the range of 0.75 to 3.0 mm, such as in the range of 1.0 to 2.0 mm.

According to some embodiments, the outer backing may be provided as dots, rills or discrete blotches.

According to some embodiments, the outer backing may be provided a substantially uniform layer of hot-melt composition.

According to some embodiments, the hot-melt composition may be applied by spraying.

According to some embodiments, the hot-melt composition may cover more than 25% of the lower surface of the flooring product.

According to a third aspect of the invention, a method to provide a flooring product is provided, the method comprising the steps of Providing a flooring product having a first side and a second side; and Applying a hot-melt composition according to the first aspect of the invention to the backside for providing a backing.

According to some embodiments, 5 to 500 g/m² of hot-melt composition is provided to the backside of the flooring product. More preferred, the amount per surface is in the range of 25 to 300 g/m², such as in the range of 50 to 250 g/m².

According to some embodiments, the hot-melt composition may be applied by melting the hot-melt composition and spraying said molten hot-melt composition to the backside of the floor covering.

According to some embodiments, the hot-melt composition may be applied by melting the hot-melt composition using a hot melt gun.

The independent and dependent claims set out particular and preferred features of the invention. Features from the dependent claims may be combined with features of the independent or other dependent claims, and/or with features set out in the description above and/or hereinafter as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE SEVERAL VIEWS OF THE DRAWING(S)

The same reference signs refer to the same, similar or analogous elements in the different figures.

DETAILED DESCRIPTION

The present invention will be described with respect to particular embodiments. It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could.

Furthermore, the particular features or characteristics may be combined in any suitable manner in one or more embodiments, as would be apparent to one of ordinary skill in the art.

A hot-melt composition according to a first embodiment is provided. It comprises thermoplastic polyurethane (TPU) named Pearlbond® available from Lubrisol, and polyvinylchloride (PVC) compound of type of Shore 65-68 A.

More in detail, the composition comprises 60 to 95% w of TPU and 5 to 40% w of PVC. The composition may comprise only this TPU and PVC. As an example, the weight ratio of TPU over PVC is between 70/30 and 80/20, the total composition consists from TPU and PVC. A melting temperature of about 115-120° C. is obtained.

Once the blend cools down it does not remain tacky. This prevents blocking of tiles (tiles sticking to each other) during shipment, especially in hot climates.

Figure 1:
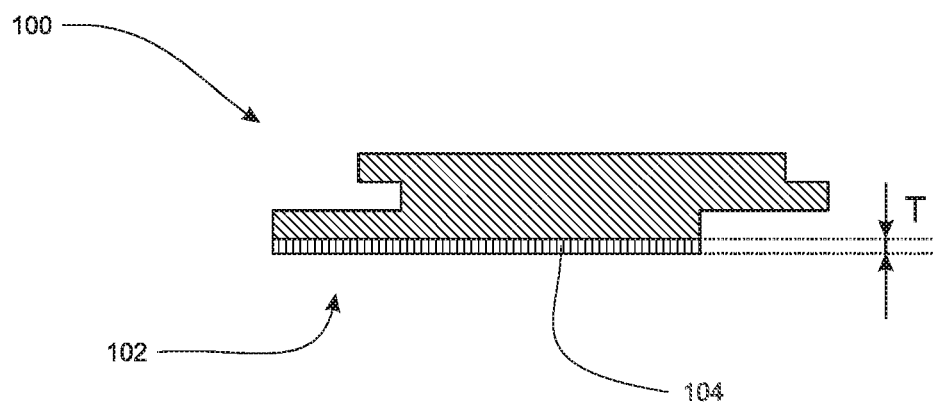
FIG. 1 is a side view of an LVT flooring product according to the invention.

As shown in FIG. 1, an LVT flooring product 100 is provided with a layered composition of PVC layer at the backing, a glass fiber reinforcement web on which a second layer of PVC is provided, a decorative print layer provided on top of this second layer of PVC, and at the upper outer surface a wear layer. The total thickness of the composition is in the range of 2 to 8 mm. The LVT is provided at its four sides with a known snap and klick system to couple adjacent LVT flooring products one to the other. Such coupling system may be any suitable coupling system.

At its lower surface 102, an outer backing 104 is provided from this hot-melt composition. It is provided by spraying or by discharging the layer of hot-melt composition to the lower side of the LVT 100. The thickness T of this outer backing 104 is about 0.5 to 1.0 mm.

This outer backing increases the friction coefficient to 15 to 18, whereas the friction coefficients of the lower backing of LVT typically is in the range of 12 to 13.

In the embodiment of FIG. 1, the hot-melt composition covers the whole lower surface 102 of the LVT flooring product. In the alternative, a limited part of the surface is only covered by this hot-melt composition. Preferably more than 10% of the surface is covered.

Alternatively, the LVT flooring product may be replaced by any other vinyl based flooring product, such as cushion vinyl, a laminate flooring product, a broadloom carpet, or a rug. In a similar way, a thin layer of the hot-melt composition may be applied to the back side of these flooring products.

Figure 2:
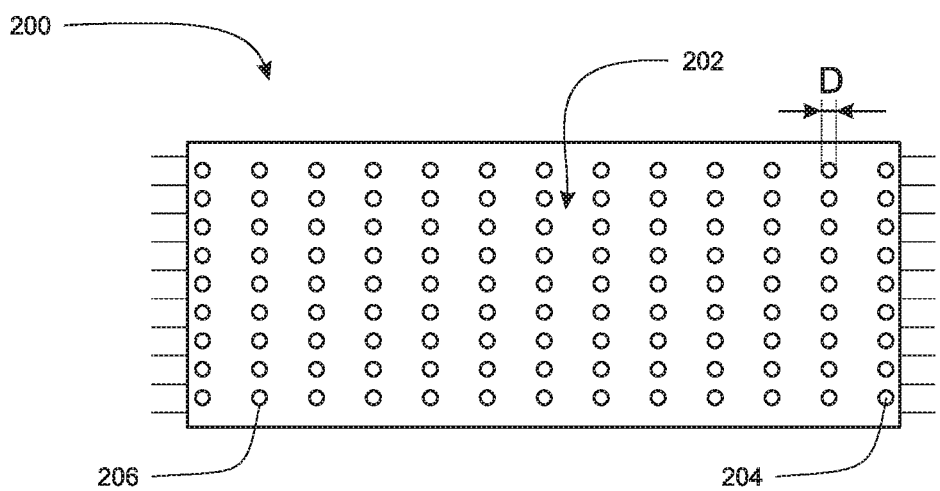
FIGS. 2 and 3 are schematic views of the lower side of a rug according to the invention.

In an alternative embodiment, as shown in FIG. 2, a rug 200 is provided. At the lower surface 202 of the rug, the outer backing 204 is provided as discrete dots 206 or discrete blotches of the same hot-melt composition as set out above. In this case circular dots of dimension 0.25 to 0.5 inch in diameter (D) and a thickness of 1.0 to 2.0 mm are provided. The total surface of the dots provides a minimum coverage of 10% of the total lower surface 202.

Figure 3:
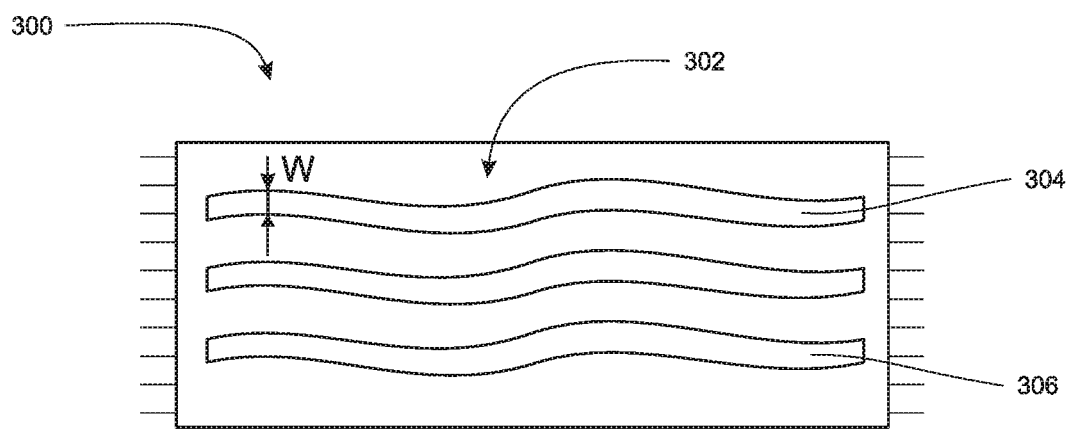

Again, this outer backing increases the friction coefficient to 15-18, whereas the friction coefficients of the lower backing of rugs typically is in the range of 10-13. In an alternative, as shown in FIG. 3, the hot-melt composition of the backing 304 may be provided as rills 306 of hot-melt composition, with a thickness of e.g. 1.0 to 2.0 mm and an average width W of 0.25 inch and covering a minimum area of 10% of the total surface of the lower surface 302 of the rug 300. The rills may have a straight or undulated shape.

Alternatively, the rugs shown in FIGS. 2 and 3 may be replaced by an LVT flooring product, or any other vinyl based flooring product, such as cushion vinyl, a laminate flooring product or a broadloom carpet.

It is to be understood that although preferred embodiments and/or materials have been discussed for providing embodiments according to the present invention, various modifications or changes may be made without departing from the scope and spirit of this invention.

The invention claimed is:

1. A flooring product having a back side comprising an outer backing provided from a hot-melt composition consisting of thermoplastic polyurethane (TPU) and polyvinylchloride (PVC), wherein the weight ratio of TPU over PVC is in the range of 50/50 to 95/5, wherein said outer backing forms more than 10% of said back side, but less than the whole back side, and wherein said outer backing is provided as dots, rills, or discrete blotches.

2. The flooring product according to claim 1, wherein the flooring product is selected from the group consisting of synthetic-based flooring products, carpets, and rugs.

3. The flooring product according to claim 1, wherein said outer backing has a thickness in the range of 0.5 to 4.0 mm.

4. The flooring product according to claim 1, wherein the hot-melt composition is applied by spraying.

5. The flooring product according to claim 1, wherein the hot-melt composition covers more than 25% of a lower surface of the flooring product.

6. The composition according to claim 1, wherein said TPU is selected from the group consisting of polyester-based, polycaprolactam-based, and polyether based TPU.

7. The composition according to claim 1, wherein said PVC has an average molecular weight in the range of 30,000 to 250,000.

8. The composition according to claim 1, wherein said composition has a melting temperature in the range of 75 to 125° C.

9. The composition according to claim 1, wherein said composition is a foamed composition or a non-foamed composition.

10. A method to provide a flooring product, the method comprising:
   providing a flooring product having a first side and a second side; and
   applying a hot-melt composition to the second side for providing a backing, wherein the backing forms more than 10% of the second side, but less than the whole second side, wherein the backing is provided as dots, rills, or discrete blotches,
   wherein the hot-melt composition consists of thermoplastic polyurethane (TPU) and polyvinylchloride (PVC), and
   wherein the weight ratio of TPU over PVC is in the range of 50/50 to 95/5.

11. The method according to claim 10, wherein the hot-melt composition is applied by melting the hot-melt composition and spraying said molten hot-melt composition to the second side of the floor covering.

12. The method according to claim 11, wherein the TPU is selected from the group consisting of polyester-based, polycaprolactam-based, and polyether based TPU.

13. The method according to claim 12, wherein the PVC has an average molecular weight in the range of 30,000 to 250,000.

14. The method according to claim 11, wherein the hot-melt composition is applied by melting the hot-melt composition using a hot melt gun.

15. The method according to claim 13, wherein the composition has melting temperature in the range of 75 to 125° C.

* * * * *